United States Patent
Schmidt et al.

(10) Patent No.: US 6,567,248 B1
(45) Date of Patent: May 20, 2003

(54) TRI-SPECTRUM AIRCRAFT LANDING LIGHT

(76) Inventors: Ronald M. Schmidt, 221 So. Sparks, Burbank, CA (US) 91506; Reynold T. Schmidt, 535 16th St., Santa Monica, CA (US) 90402

( * ) Notice: Subject to any disclaimer, the term of this patent is extended or adjusted under 35 U.S.C. 154(b) by 0 days.

(21) Appl. No.: 10/061,614

(22) Filed: Feb. 1, 2002

(51) Int. Cl.[7] ............................... F21V 9/00
(52) U.S. Cl. ............ 360/470; 362/362; 362/231; 362/802; 362/263; 250/504 R; 340/982
(58) Field of Search ................. 362/470, 471, 362/472, 183, 184, 231, 233, 240, 394, 399, 802, 260, 263, 265; 250/504 R, 504 H; 340/981, 982, 983, 815.4

(56) References Cited

U.S. PATENT DOCUMENTS

| | | | |
|---|---|---|---|
| 4,272,799 A | * | 6/1981 | Downing .................... 362/145 |
| 4,638,508 A | | 1/1987 | Hintz et al. |
| 4,862,164 A | | 8/1989 | Croley et al. |
| 5,155,415 A | | 10/1992 | Schmidt et al. |
| 5,396,243 A | | 3/1995 | Jalink, Jr. et al. |
| 5,685,637 A | | 11/1997 | Chapman et al. |
| 5,695,272 A | * | 12/1997 | Snyder et al. .............. 362/231 |
| 5,696,484 A | | 12/1997 | Kim |
| 5,929,777 A | | 7/1999 | Reynolds |
| 6,241,364 B1 | | 6/2001 | Want et al. |
| 2002/0070360 A1 | * | 6/2002 | Machi .................... 250/504 R |
| 2002/0075679 A1 | * | 6/2002 | Machi et al. ................ 362/231 |

* cited by examiner

*Primary Examiner*—Sandra O'Shea
*Assistant Examiner*—Hargobind S. Sawhney
(74) *Attorney, Agent, or Firm*—Blakely Sokoloff Taylor & Zafman

(57) ABSTRACT

An apparatus for a portable aircraft landing light system. The system has three modalities that can be controlled manually or remotely. The modalities are visible light, infrared light and FLIR emission. A ballast and battery provide constant power supply to each of the three modalities.

18 Claims, 3 Drawing Sheets

END VIEW

SIDE VIEW

TRI-SPECTRUM AIRCRAFT LANDING LIGHT

BACKGROUND OF THE INVENTION

1. Field of the Invention

This invention relates to the field of portable illumination systems and more specifically to aircraft landing assistance beacons or lights.

2. Description of the Prior Art

Incandescent lights and other single modality systems have been used for aircraft runway or landing pad illumination. Incandescent systems cause excessive blooming in night vision goggles and may provide unwanted illumination visible to the unaided eye. Incandescent lamps also have fragile filaments that can be easily damaged by vibration.

Single modality systems are inflexible and must be augmented with other types of energy emitting sources such as infrared to work with the systems aviators use for aided vision while landing such as Forward Looking Infrared (FLIR).

Aviators have a need for a single illumination system that can provide them with the ability to choose the modality of illumination remotely to fit their needs based upon their own equipment, capabilities or mission. Also, in situations where established runways or landing pads are not available the illumination system must be portable to construct a temporary landing area.

SUMMARY OF THE INVENTION

A portable aircraft landing light is disclosed which combines three different modalities used by pilots to safely land aircraft. The modalities combined are visible light, infrared light and FLIR emission referred to here as a Tri-Spectrum light.

The Tri-Spectrum light provides for the emission of heat that can be readily identified by the use of a FLIR unit. Cold cathode lamps provide the visible light and infrared light. This invention can be configured to meet the needs of military operations or non-military operations. Military operations typically use FLIR settings in a particular range of the spectrum.

The invention can be operated manually or by remote control using a radio frequency receiver which is part of a control board. The invention includes a rechargeable battery which provides power through the control board to the heat emission element. A ballast provides a start up current and power supply needed by the lamps throughout the battery's voltage operating range.

BRIEF DESCRIPTION OF THE DRAWINGS

Additional advantages of the invention will become apparent upon reading the following detailed description and upon reference to the drawings in which.

DETAILED DESCRIPTION

Exemplary embodiments are described with reference to specific configurations. Those of ordinary skill in the art will appreciate the various changes and modifications to be made while remaining within the scope of the appended claims. Additionally, well known elements, devices, components, circuits, process steps and the like are not set forth in detail in order to avoid obscuring the present invention.

The present invention is an aircraft landing illumination system for use on the ground. It is controllable by radio frequency (RF) transmissions from a remote location or manually. It consists of a housing and a tower. The tower is mounted atop the housing. The housing contains a battery, a ballast, an RF receiver and a controller for enabling the three modalities. The tower contains the three energy emitting elements of the Tri-Spectrum light.

Figure 1:
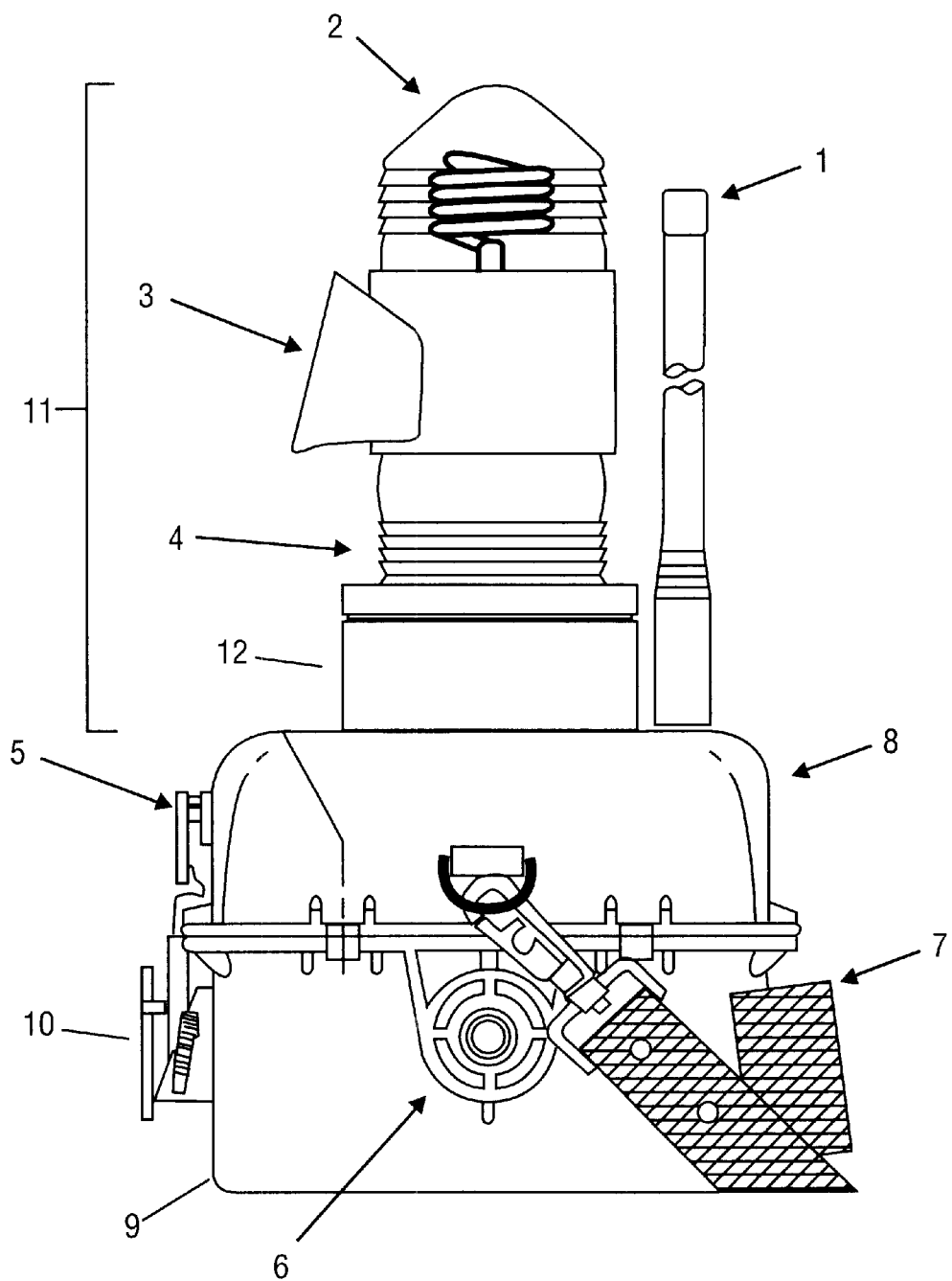
FIG. 1 depicts one embodiment of the invented portable illumination system.

One embodiment of the present invention is illustrated in FIG. 1. FIG. 1 depicts the portable signal system of the invention, which includes an upper housing 8 and a lower housing 9. The housing opens when two twist lock catches 10 or other locking mechanism are unfastened to reveal the internal components of the housing. Attached to the housing is a carrying strap to assist in the portability of the lamp.

In one implementation of the lower housing, molded onto the sides of the lower housing is a stake mounting hub. This hub allows the invention to be securely placed on the ground and held in place by stakes without having to permanently attach the invention to another object allowing use of the invention in harsh (e.g. windy) conditions.

Mounted in the upper portion of the housing is a charging jack 5 and an antenna 1. In an exemplary embodiment, the antenna is a "Rubber Duck" type antenna 1, with a bayonet connector (BNC) connected to another BNC mounted in the upper housing. This antenna is roughly equal in height to the tower 11.

The tower is mounted on top of the upper housing. The tower includes a base 12, visible light unit 2, FLIR emitter unit 3 and infrared unit 4.

In one embodiment, mounted directly above the base is the infrared unit. The infrared unit includes a cold cathode lamp and lens which combine to produce energy in the infrared range of the spectrum The lamp is connected to a ballast to provide starting and running power.

In a specific implementation of the infrared unit, a neon cold cathode lamp, part number 3611-Red from Galaxy Litebeams, LLC is used. This lamp has a strike voltage of 1500 volts and a running voltage of 600 volts. The output of lamp is approximately 7 candela. The lamp provides 360 degrees of visibility in a range of 2–10 miles dependent upon environmental conditions. The lamp is enclosed in a glass lens, part number AP-2562/1290 from Kopp Glass, Inc. The lens is treated to filter out non-infrared energy. The lens is modified by cutting away the domed top 1.86 inches above the bottom of the lens. Thereby leaving a cylindrical lens with a height of 1.86 inches. This infrared unit provides a modality that can be used alone or in combination with the other modalities. The lamp and filter lens combination produces no visible light or emission visible to the unaided eye.

Also housed in the tower is the FLIR unit 3. The FLIR unit includes a housing, a heating element and a panel support structure. The panel support structure is attached to the FLIR housing and houses the heating element.

In a specific embodiment of the invention, the FLIR unit is mounted above the infrared unit and comprised of a cylindrical housing constructed of black polycarbonate material with an attached panel support structure that houses a heating element attached to an aluminum panel. The support structure has a flat plane that is 12.8 degrees off the vertical line of the tower such that the plane faces upward away from the housing. Mounted on the face of the panel is an aluminum panel attached to a heating element. The aluminum panel is 2.75 inches by 1.75 inches by 0.05 inches with the heating element attached to the backside of the panel. The composition and dimensions of the aluminum panel are chosen to provide emissions in a range suitable for military uses. This range is affected by environmental conditions. Other metals can be used in the manufacture to obtain different ranges over similar environmental conditions.

The visible light unit 2 is also housed in the tower. This unit is composed of a cold cathode lamp housed inside a lens. The lamp is connected with the ballast to supply starting and running power.

In a specific implementation of the visible light unit, a mercury cold cathode lamp, part number 3611-White from Galaxy Litebeams, LLC is used. The lamp has a yellow coating inside. In one embodiment the yellow coating is yellow coating from the Electronic Glass Laboratory Company, Inc (EGL). The lamp has a strike voltage of 644 volts and a running voltage of 600 volts. The output of the lamp is approximately 7 candela. The lamp output is visible 360 degrees at a range of 2–10 miles dependent on environmental conditions. The lens used is a clear glass lens, part number AP-2562/9250, from Kopp Glass, Inc.

Figure 2:
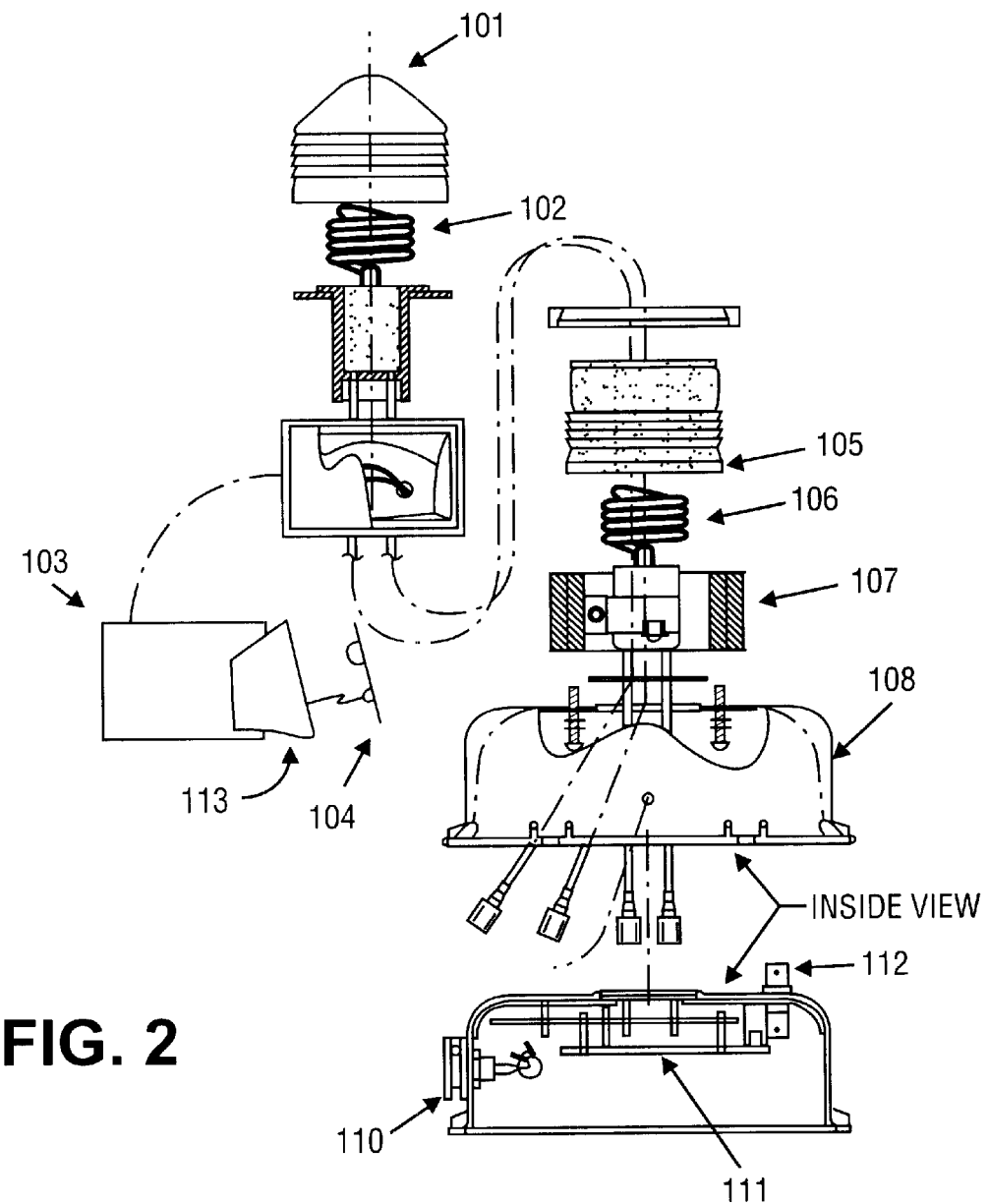
FIG. 2 depicts the internal components of the upper housing and tower of the portable illumination system.

FIG. 2 depicts the internal components of one embodiment of the tower and upper housing. Shown are the lens 101 and cold cathode lamp 102 of the visible light unit. Wires run through the center of the tower to connect the visible light unit lamp with the ballast in the lower housing. The base of the visible light unit lamp sets within the FLIR housing 103, which includes a panel support structure where the heating element 104 is attached. The infrared filter lens 105 covers the cold cathode lamp 106 of the infrared unit. The base of the infrared unit lamp sets within the base of the tower 107, which is attached to the upper housing 108. A BNC 112 is mounted within the upper housing and is connected with a receiver on a control board 111. The receiver receives RF transmissions that can enable each of the modalities separately or in any combination. The control board is coupled to the ballast and a switch for manual input. The control board enables and disables the lamps and heating element in conjunction with the ballast in response to input from the receiver and switch. The control board can also flash each lamp in response to manual or transmitted input. When the receiver receives an appropriate command the control board directs power from the ballast to either lamp. Power for the heating element is provided directly from the battery via the control board. A recharge jack 110 is also mounted in the upper housing.

Figure 3A:
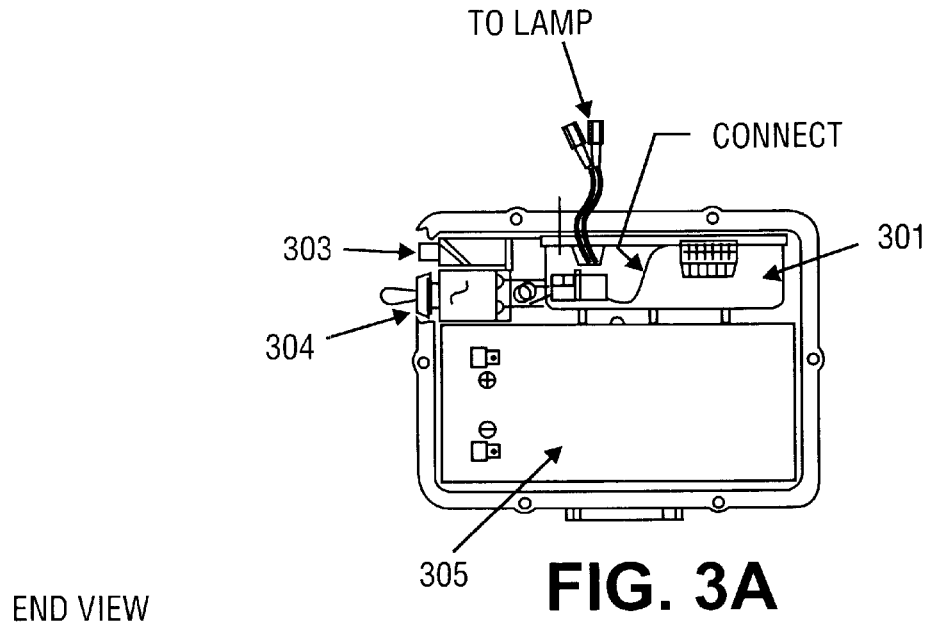
FIGS. 3A, 3B and 3C depict the external and internal portion of the lower housing of the portable illumination system.
Figure 3B:
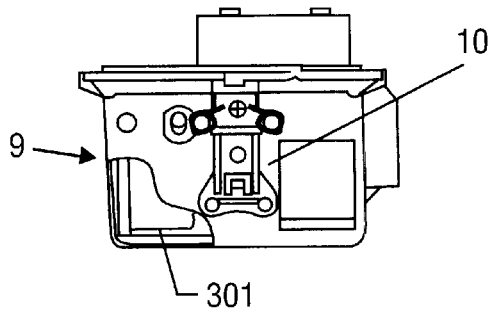
Figure 3C:
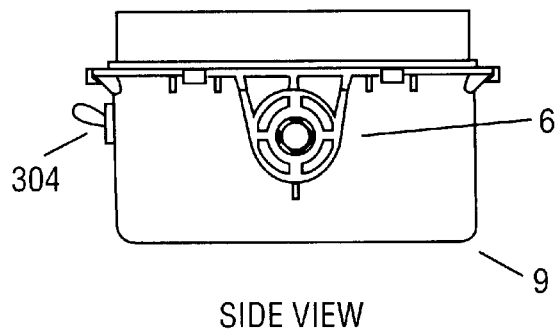

FIGS. 3A, 3B and 3C depict the internal components of one embodiment of the lower housing. The lower housing contains a battery 305 for providing power to all energy emitting sources in the invention. The voltage level of the power supplied to the lamps is controlled by a ballast 301. The heat emitting element is under the control of the control board. The heat emitting element is set to draw a specified current from the battery through the control board when selected by the control board.

Manual control input is provided by a switch, which is mounted in the wall of the housing. In one embodiment the switch has three positions corresponding to operating modes. When the switch is in the first position the unit is turned off. When the switch is in the second position the receiver and control board are enabled to wait for command from a remote transmitter transmitting on a frequency that is either pre-selected or set by a series of 'clicks' by the manual user of the switch into the third position. When the switch is in the second position the control board is supplied with power by the battery.

In a specific implementation of the invention, the battery set inside the lower housing is a 12 volt DC, 35 W 8 Amp gel cell battery. The ballast is a smart driver 301, part number 48OT305, from Galaxy Litebeams, LLC. The smart driver includes two separate drivers, one for each lamp. Battery status is displayed on an LED 303. Manual input to the control board comes from a switch 304 set on the exterior of the housing. The switch allows a user to select the mode of the landing light or to turn off the landing light to conserve power. The battery in combination with the ballast and lamp and heating element circuits can provide constant power to each modality for 8 hours without recharging.

In another embodiment of the present invention, only dual or single modalities are provided. In a dual modality implementation, the tower includes any two of a visible light unit, FLIR unit and infrared unit. In a single modality implementation only one of a visible light unit, FLIR unit and infrared unit are included in the tower.

In another embodiment of the present invention, the cold cathode lamps use other coatings, instead of a standard yellow coating, to generate light in other colors (e.g., red, blue, green, purple, etc.) or ranges of the spectrum. The specifics of other coatings are well known to persons skilled in the art. Also, the lens can be replaced with colored lenses to provide visible light in any desired color or filtering lenses to provide emissions in other ranges of the spectrum.

In another embodiment of the present invention the aluminum plate is replaced with a plate of different materials, such as stainless steel, cold rolled steel, cast iron, brass, copper, bronze, gold, silver, platinum, a plastic polymer as well as other materials suitable for producing emissions in a range of micron values.

In another embodiment of the present invention, the receiver on the control board is replaced with a transceiver to send information to a remote receiver. In this embodiment, the control board provides the transceiver with information to be transmitted to a remote receiver. Examples of information that can be provided include current operating status, battery level and modalities in use.

In another embodiment of the present invention solar panels, 12 volt batteries, battery chargers, generators, or any 12 volt DC power supply or other power source suitable for a portable landing light is used. In one embodiment, the light can be powered by attaching the appropriate power supply to the charging jack.

An exemplary use of the Tri-Spectrum light is to assist in the landing of Aircraft, especially VTOL aircraft. Ground personnel can place the light or a set of the lights around a landing area. An aviator can remotely enable the preferred modality in light of the circumstances and equipment present. A specific example is use during a covert military night operation. Ground troops carrying the invention can place a set of the lights around a landing zone in anticipation of aircraft (e.g. helicopters) arriving in support of their mission. On approach to the landing zone a pilot or flight crew can enable the FLIR unit of the light to help locate the landing zone without any visible light or verbal radio communication that might inappropriately reveal the ground troops or landing zone to hostile forces.

Other exemplary uses include use of the light as a marker to aircraft by being placed close to the object to be marked.

The light can also be used to simply provide illumination. The battery of the Tri-Spectrum Light can provide power to each emitting source for 8 hours continuously. Many of the exemplary uses, e.g. military operation, require a portable illumination system capable of long operating periods between opportunities to recharge. The invention can operate in a single mode for 8 continuous hour without recharging. Also, the unit can be manually switched off to preserve power of the invention if not in use. This long operating life is achieved through the use of the durable and energy efficient cold cathode lamps in conjunction with the ballast battery and connecting electrical circuit. Cold cathode lamps provide light equivalent to an incandescent lamp at approximately one-third the power factor. Cold cathode lamps use approximately 30% of the energy to provide the light of an incandescent lamp of equal luminescence. Additionally, the cold cathode lamp life is significantly longer than that of an equivalent incandescent lamp. A typical aviation lamp, used at airports, is rated between 1,000 to 3,000 hours. In contrast, a cold cathode lamp used for the same purpose is rated between 20,000 to 40,000 hours. The manual switch and remote operating capability also lengthen operating life as power can be conserved when the lamp is not in use and by providing an efficient remote enabling mechanism.

Having disclosed exemplary embodiments, modifications and variations may be made to the disclosed embodiments while remaining within the spirit and scope of the invention as defined by the appended claims.

What is claimed is:

1. A portable self contained landing light apparatus comprising:
    a first cold cathode lamp to emit visible light;
    a second cold cathode lamp to emit infrared light;
    a heating element to emit heat;
    a ballast coupled to each lamp;
    a rechargeable battery coupled to the ballast; and
    a control circuit coupled to the ballast, heating element and battery to receive manual or radio frequency input to control each lamp and the heating element.

2. The portable landing light apparatus of claim 1 wherein the heating element includes a panel having predetermined dimensions capable of emitting thermal energy having a predetermined wavelength.

3. The portable landing light apparatus of claim 1 wherein the visible light emitted is at least one of white, green, red, yellow and blue.

4. The portable landing light apparatus of claim 1 further comprising a battery-charging jack coupled to the rechargeable battery.

5. The portable landing light apparatus of claim 1 further comprising a switch to provide manual input to the control circuit.

6. The portable landing light apparatus of claim 1 wherein the rechargeable battery is a 12 volt gel cell.

7. The portable landing light apparatus of claim 1 wherein the battery, ballast, each lamp and the heating element operate to provide at least 8 hours of continuous operation.

8. The portable landing light apparatus of claim 1 further comprising:
    a housing to house at least one of the ballast, rechargeable battery and control circuit, including a stake-mounting hub.

9. The portable landing light apparatus of claim 8 further comprising:
    a strap to carry the apparatus coupled to the housing.

10. The portable landing light apparatus of claim 1 wherein each cold cathode lamp provides at least 7 candela of luminescence.

11. The portable landing light apparatus of claim 9 further comprising:
    a BNC coupled to the control circuit.

12. The portable landing light apparatus of claim 11 further comprising an antenna coupled to the BNC connector to provide radio frequency input to the control circuit.

13. The portable landing light apparatus of claim 2 wherein the panel is 1.75 inches by 2.75 inches by 0.05 inches of aluminum.

14. The portable landing light apparatus of claim 1 wherein the control circuit is configured to receive manual input to set a frequency to receive transmission.

15. An apparatus for assisting the landing of aircraft comprising:
    means for providing visible light to illuminate a landing area;
    means for providing infrared emissions detectable by an aircraft;
    means for emitting heat detectable by a forward looking infrared system;
    means for controlling at least one of the visible light means, infrared emission means, and heat emitting means by remote command.

16. The apparatus of claim 15 further comprising:
    means for powering at least one of the visible light means, infrared emission means, heat emitting means and control means,
    wherein the powering means, visible light means, infrared emission means, heat emitting means and control means to provide at least 8 hours of continuous operation.

17. The apparatus of claim 15 further comprising:
    means for manually setting a receiving frequency.

18. The apparatus of claim 15 further comprising,
    means for manually controlling the visible light means, infrared emission means, heat emitting means and powering means.

* * * * *